US012500840B2

(12) United States Patent
Weiner et al.

(10) Patent No.: US 12,500,840 B2
(45) Date of Patent: Dec. 16, 2025

(54) ALLEVIATING MEMORY-ACCESS CONGESTION IN NETWORK DEVICES

(71) Applicant: Mellanox Technologies, Ltd., Yokneam (IL)

(72) Inventors: Michael Weiner, Nes Ziona (IL); Amit Hermony, Givat-Ada (IL); Avi Urman, Yokneam (IL); Idan Burstein, Carmiel (IL); Yuval Shpigelman, Netanya (IL)

(73) Assignee: Mellanox Technologies, Ltd, Yokneam (IL)

( * ) Notice: Subject to any disclaimer, the term of this patent is extended or adjusted under 35 U.S.C. 154(b) by 0 days.

(21) Appl. No.: 18/307,830

(22) Filed: Apr. 27, 2023

(65) Prior Publication Data

US 2024/0364633 A1    Oct. 31, 2024

(51) Int. Cl.
*H04L 47/11* (2022.01)
*H04L 43/0852* (2022.01)
*H04L 47/122* (2022.01)

(52) U.S. Cl.
CPC ........ *H04L 47/122* (2013.01); *H04L 43/0852* (2013.01); *H04L 47/11* (2013.01)

(58) Field of Classification Search
CPC ..... H04L 47/122; H04L 43/0852; H04L 47/11
USPC ....................................................... 709/226
See application file for complete search history.

(56) References Cited

U.S. PATENT DOCUMENTS

| | | |
|---|---|---|
| 9,497,125 B2 | 11/2016 | Raindel et al. |
| 10,031,857 B2 | 7/2018 | Menachem et al. |
| 10,152,441 B2 | 12/2018 | Liss et al. |
| 10,237,376 B2 | 3/2019 | Crupnicoff et al. |
| 10,248,610 B2 | 4/2019 | Menachem et al. |
| 10,303,647 B2 | 5/2019 | Menachem et al. |
| 10,958,627 B2 | 3/2021 | Menachem et al. |
| 11,005,771 B2 | 5/2021 | Pismenny et al. |
| 11,088,966 B2 * | 8/2021 | Menachem ......... H04L 49/3018 |
| 11,356,380 B1 * | 6/2022 | White .................. H04L 47/626 |
| 2008/0259798 A1 * | 10/2008 | Loh ...................... H04L 47/125 370/235 |
| 2011/0211449 A1 * | 9/2011 | Attar ...................... H04L 47/34 370/235 |

(Continued)

OTHER PUBLICATIONS

Floyd et al., "The Addition of Explicit Congestion Notification (ECN) to IP," RFC 3168, Network Working Group, The Internet Society, pp. 1-63, Sep. 2001.

(Continued)

*Primary Examiner* — Ario Etienne
*Assistant Examiner* — Kidest Mendaye
(74) *Attorney, Agent, or Firm* — Meitar Patents Ltd.; Daniel Kligler (57) ABSTRACT

A network device includes one or more ports, processing circuitry, and a memory-network congestion controller. The one or more ports are to connect to a network. The processing circuitry is to run a plurality of processing tasks that access a shared memory, one or more of the processing tasks including communicating one or more packet flows over the network. The memory-network congestion controller is to identify a memory-access congestion, which occurs in accessing the shared memory by one or more of the processing tasks, and to alleviate the memory-access congestion by causing a reduction in a communication rate of at least one of the packet flows.

20 Claims, 3 Drawing Sheets

(56) References Cited

U.S. PATENT DOCUMENTS

| | | | | |
|---|---|---|---|---|
| 2013/0111153 A1* | 5/2013 | Lee | ......................... | G06F 3/067 |
| | | | | 711/E12.009 |
| 2015/0026361 A1* | 1/2015 | Matthews | ............... | H04L 47/30 |
| | | | | 709/234 |
| 2015/0055478 A1* | 2/2015 | Tabatabaee | ............. | H04L 47/11 |
| | | | | 370/235 |
| 2019/0379610 A1* | 12/2019 | Srinivasan | ............ | H04L 47/627 |
| 2019/0386924 A1* | 12/2019 | Srinivasan | ............ | H04L 47/122 |
| 2022/0150174 A1* | 5/2022 | Matthews | ............... | H04L 47/20 |
| 2022/0264371 A1* | 8/2022 | Strasman | .......... | H04W 28/0867 |

OTHER PUBLICATIONS

Pismenny et al., U.S. Appl. No. 17/973,962, filed Oct. 26, 2022.

\* cited by examiner

ALLEVIATING MEMORY-ACCESS CONGESTION IN NETWORK DEVICES

FIELD OF THE INVENTION

The present invention relates generally to network devices, and particularly to methods and systems for alleviating memory-access congestion in network devices.

BACKGROUND OF THE INVENTION

Modern network devices, such as network adapters, switches and network-attached storage controllers, often perform large numbers of processing tasks concurrently. Such network devices may comprise multiple processors, e.g., CPU cores and/or network processors, as well as high-bandwidth memory systems.

SUMMARY OF THE INVENTION

An embodiment that is described herein provides a network device including one or more ports, processing circuitry, and a memory-network congestion controller. The one or more ports are to connect to a network. The processing circuitry is to run a plurality of processing tasks that access a shared memory, one or more of the processing tasks including communicating one or more packet flows over the network. The memory-network congestion controller is to identify a memory-access congestion, which occurs in accessing the shared memory by one or more of the processing tasks, and to alleviate the memory-access congestion by causing a reduction in a communication rate of at least one of the packet flows.

In some embodiments, the memory-network congestion controller is to cause the reduction in the communication rate by sending to a remote network device a notification that causes the remote network device to throttle-down a transmission rate of a packet flow. In some embodiments, the memory-network congestion controller is to cause the reduction in the communication rate by sending to a remote network device information indicative of network any actual network congestion, irrespective of congestion. In some embodiments, the memory-network congestion controller is to cause the reduction in the communication rate by throttling-down a transmission rate of a packet flow to a remote network device.

In a disclosed embodiment, the one or more packet flows include first and second packet flows having respective first and second communication priorities, the first communication priority being higher than the second communication priority, and the memory-network congestion controller is to cause the reduction in the communication rate in the second packet flow. In an example embodiment, the memory-network congestion controller is to cause the reduction in the communication rate by modifying a packet dropping policy applied to the at least one of the packet flows.

In another embodiment, the one or more packet flows comprise first and second packet flows having respective first and second sensitivities to latency, the first sensitivity being higher than the second sensitivity, and the memory-network congestion controller is to cause the reduction in the communication rate in the second packet flow.

In an example embodiment, the memory-network congestion controller is to identify the memory-access congestion by identifying that a given processing task or group of tasks, among the processing tasks, has exceeded a memory-usage quota allocated thereto. In another embodiment, the memory-network congestion controller is to identify the memory-access congestion by identifying that an overall memory-usage of the processing tasks has exceeded a threshold.

Additionally or alternatively, the memory-network congestion controller is to identify the memory-access congestion by identifying that a latency of a given processing task or group of tasks, among the processing tasks, in accessing the shared memory is above a defined limit. Further additionally or alternatively, the memory-network congestion controller is to identify the memory-access congestion by identifying a trend of increasing latency in accessing the shared memory by one or more of the processing tasks. In some embodiments, the memory-network congestion controller is to identify the memory-access congestion by monitoring notifications of a feedback mechanism between the processing tasks and the shared memory.

There is additionally provided, in accordance with an embodiment described herein, a method in a network device, including running in the network device a plurality of processing tasks that access a shared memory. One or more of the processing tasks includes communicating one or more packet flows over the network. A memory-access congestion, which occurs in accessing the shared memory by one or more of the processing tasks, is identified. The memory-access congestion is alleviated by causing a reduction in a communication rate of at least one of the packet flows.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved techniques for alleviating memory-access congestion in network devices. The disclosed techniques can be used in various types of network devices, e.g., network adapters, switches and network-attached storage controllers.

In some embodiments, a network device comprises one or more ports for communicating over a network, processing circuitry that performs various processing tasks, and a shared memory that serves the processing circuitry. The processing circuitry may access the shared memory via a coherent fabric and/or via a system-level cache.

Processing tasks may be implemented in hardware and/or in software. Some of the processing tasks may relate to communication of packet flows over the network, while other processing tasks may not. For example, the processing circuitry may comprise a network processor that processes packet flows, and one or more Central Processing Unit (CPU) cores that perform other computations.

In performing the various processing tasks, the processing circuitry accesses the shared memory, e.g., for storing and retrieving packet data and other information. Theoretically, it is possible to design the shared memory (including the fabric and cache, if used) to support worst-case bandwidth requirements. Such an overdesign, however, would be extremely wasteful in terms of cost, size and power consumption.

In most practical implementations, therefore, it is possible that the processing tasks will temporarily exceed the access bandwidth capability of the shared memory, causing memory-access congestion. For example, multiple uncoordinated processing tasks may attempt to access the shared memory concurrently. Unless mitigated, such memory-access congestion may lead to poor Quality-of-Service, e.g., due to excessive latency and/or dropping of packets.

In some embodiments of the present invention, the network device further comprises a memory-network congestion controller that identifies and alleviates (i.e., eliminates or at least eases) memory-access congestion. The memory-network congestion controller alleviates memory-access congestion by causing a reduction in the communication rate of at least one of the packet flows handled by the processing circuitry. Reducing the rate of a packet flow on the network side, in turn, causes the corresponding processing task to reduce its memory-access bandwidth on the memory side.

In various embodiments, the memory-network congestion controller may use various techniques for causing a reduction in the communication rate of a packet flow. In some embodiments, the memory-network congestion controller sends a request to a remote network device, requesting the remote network device to throttle-down the transmission rate of the packet flow.

In one example, the memory-network congestion controller sends the remote network device a "fake" Explicit Congestion Notification (ECN). The fake ECN notifies the remote network device of network congestion that is allegedly observed in processing the packet flow, irrespective of any actual network congestion. As a result, the remote network device will throttle-down the packet flow in question. Since the network device receives and processes packets at a smaller rate, memory-access congestion is eased.

In another embodiment, the memory-network congestion controller modifies a packet dropping policy, e.g., a Weighted Random Early Detection (WRED) policy, which is applied to the packet flow in the network device.

In some embodiments, when the network device handles multiple packet flows simultaneously, the memory-network congestion controller may use various criteria for selecting which packet flows to throttle-down in order to reduce memory-access congestion. In one embodiment, the packet flows are assigned respective communication priorities, and the memory-network congestion controller selects lower-priority packet flows for throttling-down. In another embodiment, the memory-network congestion controller selects packet flows that are relatively insensitive to latency.

In some embodiments, the memory-network congestion controller is able to predict that memory-access congestion is imminent, before the congestion degrades performance below acceptable limits. Thus, in the present context, the phrase "identifying memory-access congestion", in various grammatical forms, refers both to actual congestion having adverse effect on the network device performance, and to imminent congestion that is developing but does not yet have an impact on performance. Example techniques for identifying imminent memory-access congestion are described herein.

The disclosed techniques provide a unique nexus of resolving congestion in the memory domain (memory-access congestion) by performing actions in the network domain (throttling-down packet flows). By using the disclosed techniques, network devices can provide improved Quality-of-Service (QOS) during memory congestion. The disclosed techniques also enable designing memory devices with smaller memory-access bandwidths, thereby reducing cost, size and power consumption.

System Description

Figure 1:
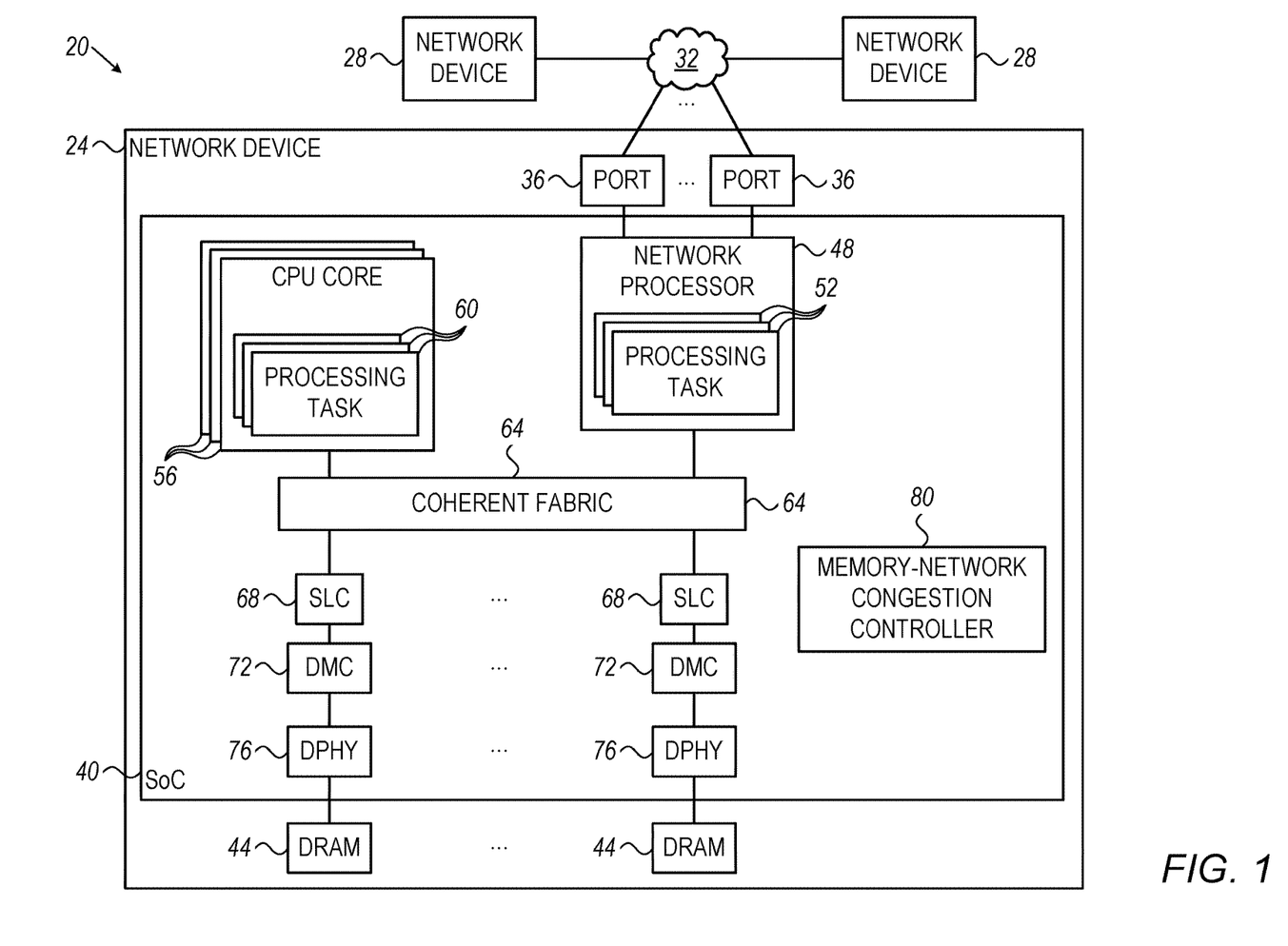
FIG. 1 is a block diagram that schematically illustrates a network device in a network communication system, in accordance with an embodiment of the present invention.

FIG. 1 is block diagram that schematically illustrates a network communication system 20 comprising a network device 24, in accordance with an embodiment of the present invention. In system 20, network device 24 communicates with remote network devices 28 over a network 32. Network devices 24 and 28 and network 32 may operate in accordance with any suitable network protocol, such as Ethernet or InfiniBand™ (IB). Network device 24 may comprise, for example, a network adapter (e.g., an Ethernet NIC or an InfiniBand HCA, including "Smart NICs", also referred to as Data Processing Units—DPUs), a switch, a router, a network-attached storage controller, a Graphics Processing Unit (GPU) having networking capabilities, or any other suitable network device.

Network device 24 comprises one or more ports 36 for sending and receiving packets to and from network 32. Network device 24 further comprises a System-on-Chip (SoC) 40 and one or more Dynamic Random-Access Memory devices (DRAMs) 44. SoC 40 comprises a network processor 48 that runs processing tasks 52, and one or more CPU cores 56 that run processing tasks 60. Network processor 48 and CPU cores 56 are referred to herein collectively as the "processing circuitry" of network device 24. In alternative embodiments, the processing circuitry may comprise any other suitable configuration.

Processing tasks 52 are typically related to transmission and reception of packet flows between network device 24 and remote network devices 28. Processing tasks 60 typically perform other kinds of processing, which may or may not be directly related to network communication.

Typically, both processing tasks 52 (of network processor 48) and processing tasks 60 (of CPU cores 56) access DRAMs 44 for storing and retrieving data. DRAMs 44 are referred to herein as a shared memory. In alternative embodiments, the shared memory may comprise any other suitable memory that is accessible to the various processing tasks.

SoC 40 further comprises a coherent fabric 64, which connects network processor 48 and CPU cores 56 to the shared memory. Fabric 64 performs various security and coherence checks on memory-access requests issued by network processor 48 and CPU cores 56, and routes the requests and corresponding responses. In the example of FIG. 1, each DRAM 44 is accessed via a System-Level Cache 68, a DRAM controller (DMC) 72 and a DRAM Physical Layer device (DPHY) 76.

Fabric 64, SLCs 68, DMCs 72, DHYs 76 and DRAMs 44 are also referred to jointly as the Memory Subsystem (MSS) of network device 24. The terms MSS and shared memory are sometimes used interchangeably herein. In alternative embodiments, the MSS may have any other suitable configuration.

In the example of FIG. 1, DRAMs 44 are located in network device 24 but externally to SoC 40 ("off-chip"). This configuration, however, is not mandatory. For example, when network device 24 is a NIC that serves a host (not seen in the figure), DRAMs 44 (or other type of shared memory) may be located in the host and accessed over a peripheral bus. Generally, the shared memory may be centralized or distributed, and may be located at any suitable location or locations.

In the disclosed embodiment, network device 24 further comprises a memory-network congestion controller 80 (referred to herein simply as "controller" for brevity). Controller 80 identifies and alleviates memory-access congestion events using methods that are described in detail below.

The configurations of system 20 and network device, as shown in FIG. 1, are example configurations that are chosen purely for the sake of conceptual clarity. In alternative embodiments, any other suitable configurations can be used. Elements that are not necessary for understanding the principles of the present invention, such as various interfaces, addressing circuits, timing and sequencing circuits and debugging circuits, have been omitted from the figures for clarity.

The various elements of network device 24 may be implemented in hardware, e.g., in one or more Application-Specific Integrated Circuits (ASICs) or FPGAs. Additionally or alternatively, elements of network device 24 may be implemented using software, or using a combination of hardware and software elements.

In some embodiments, network processor 48 and/or CPU cores 56 may be implemented, in part or in full, using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Mitigating Memory-Access Congestion by Throttling Network Communication Rate

During normal operation of network device 24, processing tasks 52 transmits and receive packet flows over network 32, and processing tasks 60 perform other functions. Both tasks 52 and tasks 60 access DRAMs 44 for storing and retrieving data as part of their normal operation.

Under certain circumstances, the access of processing tasks 52 and/or 60 to DRAMs 44 may cause memory-access congestion. Memory-access congestion can be defined in various ways. Examples of criteria for memory-access congestion may include the following non-limiting examples:

The memory bandwidth required by processing tasks 52 and/or 60 at a certain time exceeds the maximal memory-access bandwidth of the shared memory.

The memory bandwidth required by processing tasks 52 and/or 60 at a certain time exceeds a defined threshold (which in turn may be derived from the maximal memory-access bandwidth of the shared memory).

The memory-access bandwidth of a specific processing task, or of a specific group of processing tasks, exceeds a defined threshold.

The latency observed in accessing the shared memory by a specific processing task (or group of tasks, or all tasks) exceeds a defined limit. The limit may be defined, for example, relative to the average memory-access latency of that processing task (or group of tasks, or all tasks).

In some embodiments, upon detecting memory-access congestion, controller 80 alleviates the congestion by throttling-down the communication rate of at least one of the packet flows that are currently communicated between network device 24 and remote network devices 28. When the communication rate of a packet flow is reduced, the processing task 52 handling this packet flow will typically reduce its rate of accessing the shared memory. As a result, memory-access congestion will be eased.

Figure 2:
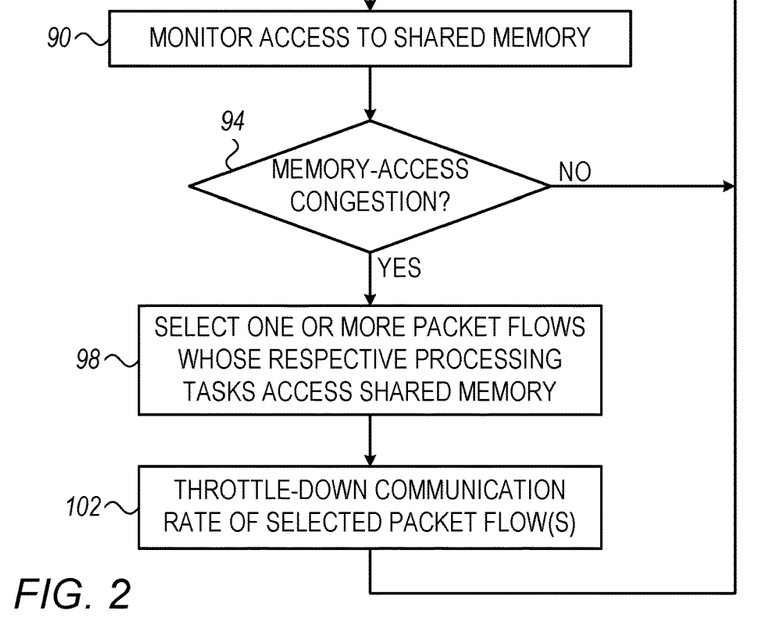
FIG. 2 is a flow chart that schematically illustrates a method for alleviating memory-access congestion in the network device of FIG. 1, in accordance with an embodiment of the present invention.

FIG. 2 is a flow chart that schematically illustrates a method for alleviating memory-access congestion in the shared memory of network device 24, in accordance with an embodiment of the present invention. The method begins with memory-network congestion controller 80 monitoring the access of processing tasks 52 and 60 to the shared memory, at a monitoring stage 90.

At a congestion detection stage 94, controller 80 checks whether memory-access congestion occurs in accessing the shared memory. If no memory-access congestion is observed, the method loops back to stage 90 above. Otherwise, if memory-access congestion is detected, controller 80 selects one or more packet flows to be throttled-down, at a flow selection stage 98. At a rate reduction stage 102, controller 80 throttles-down the communication rate of the selected flow or flows. The method then loops back to stage 90 above.

The method flow shown in FIG. 2 is a simplified example flow that is depicted purely for the sake of conceptual clarity. In example embodiments, any other suitable method flow can be used. Example techniques for monitoring access to the shared memory, for identifying memory-access congestion, for selecting packet flows to be throttled-down, and for reducing the rate of a packet flow, are described further below.

In various embodiments, controller 80 may use various mechanisms for reducing the communication rate of a packet flow. In some embodiments, controller 80 sends a notification to the remote network device 28 at the far end of the packet flow in question, requesting the remote network device to throttle-down the communication rate of the packet flow. As a result, the communication rate of incoming packets belonging to the packet flow will be reduced.

In an example embodiment, controller 80 sends remote network device 28 an Explicit Congestion Notification (ECN), which notifies the remote network device of network congestion that is allegedly observed in processing the packet flow. The ECN mechanism is specified, for example, in "The Addition of Explicit Congestion Notification (ECN) to IP," Internet Engineering Task Force (IETF) Request For Comments (RFC) 3168 September, 2001, which is incorporated herein by reference.

In other embodiments, controller 80 may send other suitable notifications, packet or message that indicate network congestion to the remote network device. For example, while in RDMA the ECN is typically sent using a Congestion Notification Packet (CNP), in Ethernet the ECN is typically indicated by setting a bit in an Acknowledgement (ACK) packet sent to the remote network device.

In these embodiments, controller 80 sends the ECN or other notification irrespective of any actual network congestion. In other words, in many cases controller 80 will send a network congestion notification even though no network congestion exists. In the this sense, notification can be regarded as a "fake" or "imitated" network congestion notification. The purpose of the fake notification is to cause remote network device 28 to reduce the communication rate of the packet flow, for the sake of reducing memory-access bandwidth in network device 24. The use of ECN, CNP, ACK or other such protocols eliminates the need for modifications in remote network devices 28. In this manner, network device 24 is able to carry out the disclosed technique while communicating with legacy remote network devices.

Further alternatively, controller 80 may use any other suitable protocol or mechanism to send information indicative of network congestion to the remote network device, even though no actual network congestion exists. Several non-limiting examples include the following:

- Send the remote network device false telemetry reports that are indicative of network congestion. False telemetry may comprise, for example, a Round-Trip Time (RTT) value that is higher than the actual RTT, a false queue state that indicates a queue fill level that is higher than the actual fill level, a bandwidth usage value higher than the actual bandwidth usage, etc.
- For packet flows that use credit-based flow control, send the remote network device false credit allocations that are lower than the actual credit allocation.
- For packet flows that use Priority Flow Control (PFC), send the remote network device false PFC "PAUSE" messages.

In some embodiments, the above messages, notifications or packets are sent to the remote network device by controller 80. In other embodiments, controller 80 may instruct network processor 48 to send messages, notifications or packets in question.

In some embodiments, controller 80 requests network processor 48 to reduce the communication rate of outgoing packets belonging to the packet flow in question. In yet another embodiment, the memory-network congestion controller modifies a packet dropping policy, e.g., a Weighted Random Early Detection (WRED) policy, which is applied to the packet flow in the network device. A more liberal packet dropping policy (i.e., a policy that drops a larger percentage of packets) reduces the computational resources needed for processing the remaining packets, and therefore aids in reducing memory-access congestion. Generally, controller 80 may use any other suitable technique for causing a reduction in the communication rate of a packet flow, for the sake of reducing memory-access congestion.

When network device 24 handles multiple packet flows simultaneously, and memory-access congestion is detected, controller 80 may use various criteria for selecting packet flows for throttling-down. The selection criterion typically aims to select packet flows that, if throttled-down, cause the least degradation in overall performance.

In some embodiments, the packet flows are assigned respective priorities relative to one another. The priorities may correspond, for example, to different Quality-of-Service (QOS) classes, also referred to as Traffic Classes (TCs). In an embodiment, controller 80 attempts selecting lower-priority packet flows over high-priority packet flows. With this selection criterion, high-priority packet flows will suffer less degradation in transmission rate than low-priority packet flows.

In another embodiment, controller 80 attempts selecting packet flows that are less sensitive to latency, over packet flows that are more sensitive to latency. For example, flows that transfer data are typically less sensitive to latency than flows that transfer real-time video or speech. Throttling-down packet flows that are relatively latency-tolerant provides better overall QoS.

Additionally or alternatively, controller 80 may use any other suitable selection criteria for choosing which packet flows to throttle-down in the event of memory-access congestion.

Resource Allocation, Monitoring and Regulation

In some embodiments, controller 80 assigns memory resources to processing tasks 52 and 60, and monitors the actual usage of the resources by the processing tasks. When the actual usage of a resource by a processing task exceeds its allocation, controller 80 alleviates the resulting memory-access congestion using the techniques described above.

In some embodiments, controller 80 divides processing tasks 52 and 60 into groups referred to as partitions. A partition may comprise one or more processing tasks. The partitions are the basic units for which memory resources are allocated, monitored and regulated. Controller 80 assigns each partition a partition identifier (PARTID). In an example embodiment, the total number of partitions is up to thirty-two. In an example embodiment, one or more of the partitions can be defined as secure partitions that can be accessed only by hardware.

In addition, controller 80 defines one or more Performance Monitoring Groups (PMGs). Each PMG comprises one or more partitions whose performance should be monitored. Controller 80 assigns each PMG a PMG identifier (PMGID). Performance can be monitored and regulated by partition and/or by PMG.

Controller 80 may assign any suitable resources of the memory subsystem (MSS) of network device 24 to the various partitions. Resources may include, for example, one or more of the following:

- Memory-access bandwidth and priority in accessing DRAMs 44.
- Bandwidth and priority in coherent fabric 64.
- Memory space in SLCs 68.

Additionally or alternatively, any other suitable memory resource type can be used.

Figure 3:
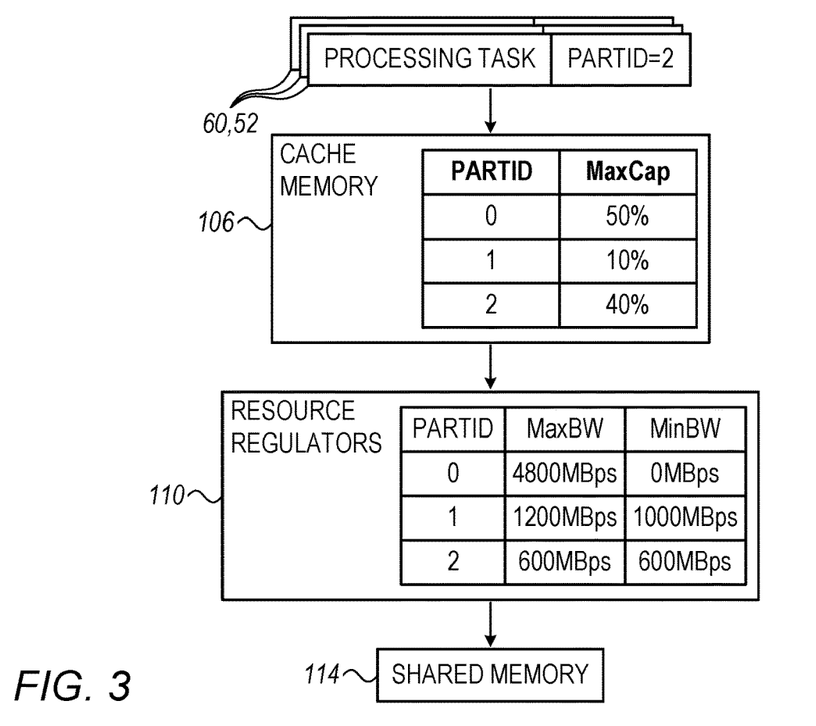
FIG. 3 is a diagram that schematically illustrates allocation of Memory Subsystem (MSS) resources in the network device of FIG. 1, in accordance with an embodiment of the present invention.

FIG. 3 is a diagram that schematically illustrates allocation of MSS resources by controller 80 in network device 24, in accordance with an embodiment of the present invention. In this embodiment, processing tasks 52 and 60 access a shared memory 114 (e.g., DRAMs 44 of FIG. 1). Processing tasks 52 and 60 are partitioned among three partitions having PARTIDs={0, 1, 2}. Each processing task is assigned a PARTID, depending on the partition to which the task belongs.

Controller 80 comprises a cache memory allocation table 106 and one or more resource regulators 110. Table 106 specifies the maximal capacity of SLCs 68 that may be allocated to each partition. In the present example, the maximal capacity of a given partition is specified as a percentage of the overall SLC size (e.g., 50%, 10%, 40%). Resource regulators 110 control the memory-access bandwidth to shared memory 114. In the present example, regulators 110 set a minimal memory-access bandwidth and a maximal memory-access bandwidth, in MBps, per partition. The minimal memory-access bandwidth typically indicates an assured, or guaranteed, bandwidth, assuming no oversubscription. The maximal memory-access bandwidth typically assumes a certain degree of oversubscription.

Figure 4:
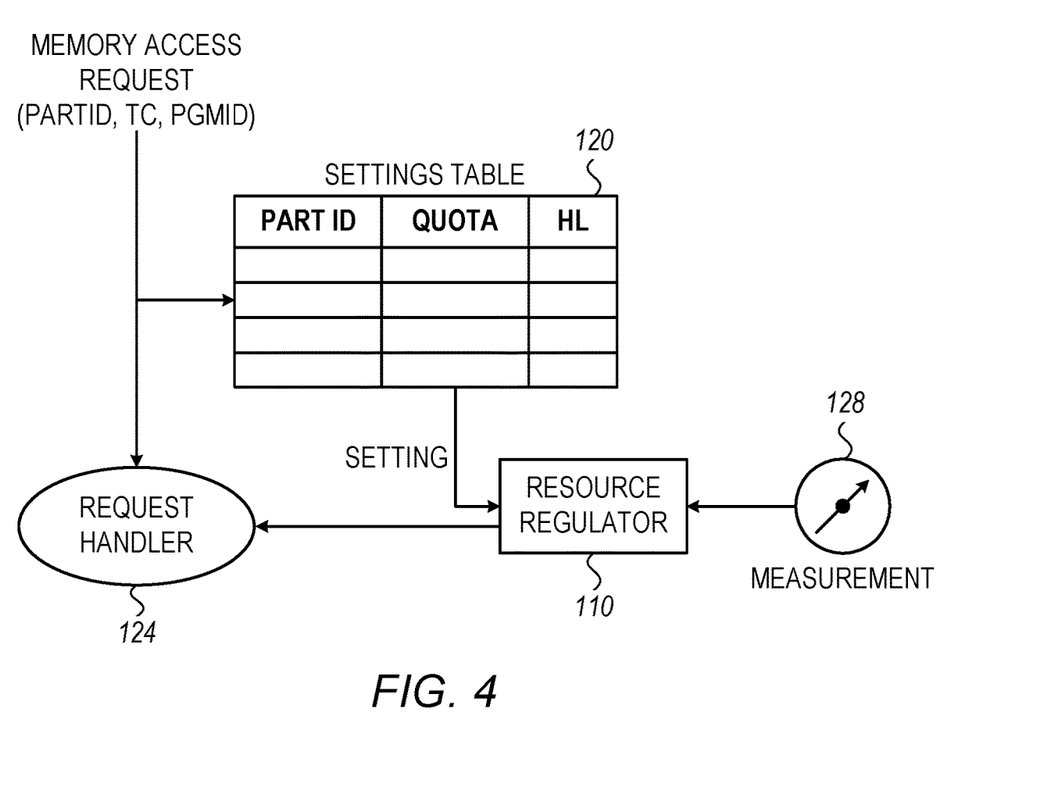
FIG. 4 is a diagram that schematically illustrates monitoring and regulation of MSS resources in the network device of FIG. 1, in accordance with an embodiment of the present invention.

FIG. 4 is a diagram that schematically illustrates monitoring and regulation of MSS resources by controller 80 in network device 24, in accordance with an embodiment of the present invention. In the present example, controller 80 comprises one or more settings tables 120, a request handler 124, a measurement module 128, and one or more resource regulators 110.

A given settings table 120 specifies allocation of a certain MSS resource per PARTID. In addition to the quota of the resource allocated to each table 120 specifies, per PARTID, whether or not the allocation is a Hard Limit (HL). Typically, a respective table 120 is defined for each resource regulator 110. The figure shows a single regulator and a single settings table, for clarity.

Request handler 124 handles memory access requests (e.g., read and write requests) that are issued by processing tasks 52 and 60. A given memory access request specifies (in addition to address and data as appropriate) the corresponding PARTID, Traffic Class (TC) and PGMID.

On arrival of a new memory access request, controller 80 queries settings table 120 and extracts the resource allocation ("setting") corresponding to the request's PARTID and TC. In parallel, measurement module 128 measures the actual usage of the resource in question per PARTID. Both the resource allocation ("setting") and the actual resource usage are provided as inputs to resource regulator 110. Regulator 110 checks whether the actual usage exceeds the allocation or not, and provides the decision to request handler 124. Request handler 124 may act on the decision in any suitable way, e.g., initiate "Completer Busy" (CBusy) reporting as elaborated below, initiate soft throttling of a data flow, or perform any other suitable action.

The resource allocation, measurement and regulation schemes described with respect to FIGS. 3 and 4 are example schemes that are chosen purely for conceptual clarity. In alternative embodiments, any other suitable scheme can be used.

Predicting and Acting on Imminent Memory-Access Congestion

In some embodiments, controller 80 predicts that memory-access congestion is developing, before the congestion has a noticeable impact on the performance of network device 24. This capability enables controller 80 to initiate responsive action, e.g., throttling-down of packet flows using the above-described techniques, and preempt the congestion. In various embodiments, controller 80 may predict memory-access congestion in various ways.

For example, in some embodiments controller 80 monitors the latency of the memory-access operations (e.g., read and/or write operations) issued by the various processing tasks 52 and/or 60. Controller 80 attempts to identify trends in which the latency increases over time. A progressively-increasing latency of memory-access operations is typically indicative of imminent memory-access congestion.

In other embodiments, the processing tasks and the shared memory (MSS) use a closed-loop feedback mechanism in which the shared memory reports how busy it is in handling memory-access requests. Controller 80 monitors these reports and uses them for predicting future occurrence of memory-access congestion. In response to identifying imminent memory-access congestion, controller 80 may prevent the congestion by initiating throttling-down of one or more packet flows, as described above.

In the context of such a closed-loop feedback mechanism, processing tasks 52 and 60 are referred to as "Requesters", and the MSS is referred to as a "completer".

In some embodiments, the processing tasks and the shared memory use a feedback mechanism referred to as "Completer Busy" (CBusy). In these embodiments, the shared memory sends periodic CBusy notifications to network processor 48 and CPU cores 56. Each Cbusy notification indicates the extent to which the shared memory is busy. In one example implementation, the CBusy notification specifies one of four levels—(i) "Not busy" meaning utilization is below 50%, (ii) "Low busy" meaning utilization is between 50% and 75%, "Medium busy" meaning utilization is between 75% and 90%, and (iv) "High busy" meaning utilization is above 90%.

Processing tasks 52 and 60 may use the CBusy notifications as a hint, or recommendation, as to whether and how to throttle their memory-access operations. In one example implementation, the processing tasks respond to "Not busy" and "Low busy" notifications by throttling-up memory-access transactions (if needed). In response to "Medium busy" notifications, the processing tasks may retain the current rate of memory-access transactions. In response to "High busy" notifications, the processing tasks would typically throttle-down the rate of memory-access transactions. Note that this throttling of memory-access operations is performed within network device 24, and should not be confused with throttling of packet flows over network 32.

In some embodiments, in addition to the CBusy mechanism, the processing tasks and the shared memory use a credit-based flow-control loop that regulates the rate of memory-access transactions. Further alternatively, any other suitable feedback mechanism can be used.

In an embodiment, memory-network congestion controller 80 monitors the feedback notifications (e.g., CBusy notifications) sent by the shared memory, and uses these notifications as indicators of imminent memory-access congestion. For example, controller 80 may initiate throttling-down of packet flows in response to monitoring "Medium busy" CBusy notifications. Alternatively, any other suitable criterion can be used.

It will be appreciated that the embodiments described above are cited by way of example, and that the present invention is not limited to what has been present particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A network device, comprising:
one or more ports, to connect to a network;
processing circuitry, to run a plurality of processing tasks that access a shared memory, one or more of the processing tasks comprising communicating one or more packet flows over the network; and
a memory-network congestion controller, to:
identify a memory-access congestion, which is caused by one or more of the processing tasks attempting to access the shared memory in a manner that exceeds an access capability of the shared memory;

upon identifying the memory-access congestion, select, from among the one or more packet flows, a given packet flow that originates from a remote device and is processed by a given processing task that accesses the shared memory; and alleviate the memory-access congestion by sending to the remote device a fake congestion notification, which indicates that the given packet flow is allegedly causing network congestion and requests the remote device to reduce a communication rate of the given packet flow, the fake congestion notification being sent irrespective of any actual network congestion.

2. The network device according to claim 1, wherein the memory-network congestion controller is to further alleviate the memory-access congestion by throttling-down a transmission rate of a packet flow to another remote device.

3. The network device according to claim 1, wherein the one or more packet flows comprise first and second packet flows having respective first and second communication priorities, the first communication priority being higher than the second communication priority, and wherein the memory-network congestion controller is to cause the reduction in the communication rate in the second packet flow.

4. The network device according to claim 1, wherein the memory-network congestion controller is to further alleviate the memory-access congestion by modifying a packet dropping policy applied to at least one of the packet flows.

5. The network device according to claim 1, wherein the one or more packet flows comprise first and second packet flows having respective first and second sensitivities to latency, the first sensitivity being higher than the second sensitivity, and wherein the memory-network congestion controller is to cause the reduction in the communication rate in the second packet flow.

6. The network device according to claim 1, wherein the memory-network congestion controller is to identify the memory-access congestion by identifying that a given processing task or group of tasks, among the processing tasks, has exceeded a memory-usage quota allocated thereto.

7. The network device according to claim 1, wherein the memory-network congestion controller is to identify the memory-access congestion by identifying that an overall memory-usage of the processing tasks has exceeded a threshold.

8. The network device according to claim 1, wherein the memory-network congestion controller is to identify the memory-access congestion by identifying that a latency of a given processing task or group of tasks, among the processing tasks, in accessing the shared memory is above a defined limit.

9. The network device according to claim 1, wherein the memory-network congestion controller is to identify the memory-access congestion by identifying a trend of increasing latency in accessing the shared memory by one or more of the processing tasks.

10. The network device according to claim 1, wherein the memory-network congestion controller is to identify the memory-access congestion by monitoring notifications of a feedback mechanism between the processing tasks and the shared memory.

11. A method in a network device, the method comprising:
running in the network device a plurality of processing tasks that access a shared memory, one or more of the processing tasks comprising communicating one or more packet flows over the network;

identifying a memory-access congestion, which is caused by one or more of the processing tasks attempting to access the shared memory in a manner that exceeds an access capability of the shared memory;

upon identifying the memory-access congestion, selecting, from among the one or more packet flows, a given packet flow that originates from a remote device and is processed by a given processing task that accesses the shared memory; and alleviating the memory-access congestion by sending to the remote device a fake congestion notification, which indicates that the given packet flow is allegedly causing network congestion and requests the remote device to reduce a communication rate of the given packet flow, the fake congestion notification being sent irrespective of any actual network congestion.

12. The method according to claim 11, wherein alleviating the memory-access congestion further comprises throttling-down a transmission rate of a packet flow to another remote device.

13. The method according to claim 11, wherein the one or more packet flows comprise first and second packet flows having respective first and second communication priorities, the first communication priority being higher than the second communication priority, and wherein causing the reduction in the communication rate is performed in the second packet flow.

14. The method according to claim 11, wherein alleviating the memory-access congestion further comprises modifying a packet dropping policy applied to at least one of the packet flows.

15. The method according to claim 11, wherein the one or more packet flows comprise first and second packet flows having respective first and second sensitivities to latency, the first sensitivity being higher than the second sensitivity, and wherein causing the reduction in the communication rate is performed in the second packet flow.

16. The method according to claim 11, wherein identifying the memory-access congestion comprises identifying that a given processing task or group of tasks, among the processing tasks, has exceeded a memory-usage quota allocated thereto.

17. The method according to claim 11, wherein identifying the memory-access congestion comprises identifying that an overall memory-usage of the processing tasks has exceeded a threshold.

18. The method according to claim 11, wherein identifying the memory-access congestion comprises identifying that a latency of a given processing task or group of tasks, among the processing tasks, in accessing the shared memory is above a defined limit.

19. The method according to claim 11, wherein identifying the memory-access congestion comprises identifying a trend of increasing latency in accessing the shared memory by one or more of the processing tasks.

20. The method according to claim 11, wherein identifying the memory-access congestion comprises monitoring notifications of a feedback mechanism between the processing tasks and the shared memory.

* * * * *